United States Patent [19]

Bialy et al.

[11] Patent Number: 4,635,907

[45] Date of Patent: Jan. 13, 1987

[54] HYDRAULIC BUFFER FOR ELEVATORS

[75] Inventors: Louis Bialy, Dundas; Frederick P. Menet, Burlington, both of Canada

[73] Assignee: Otis Elevator Company, Farmington, Conn.

[21] Appl. No.: 821,216

[22] Filed: Jan. 21, 1986

Related U.S. Application Data

[63] Continuation of Ser. No. 512,520, Jul. 11, 1983, abandoned.

[51] Int. Cl.[4] .................. F16F 9/32; F16F 9/36; F16F 9/48
[52] U.S. Cl. ............................. 267/8 R; 187/67; 188/269; 188/315; 188/322.17; 384/134
[58] Field of Search ............ 188/269, 287, 297, 315, 188/322.17; 308/3.5; 267/8 R, 126; 187/67; 384/134, 368

[56] References Cited

U.S. PATENT DOCUMENTS

| 1,486,381 | 3/1924 | Jaenichen | 267/8 R |
|---|---|---|---|
| 2,040,063 | 5/1936 | Padgett | 188/315 |
| 2,155,978 | 4/1939 | Oberstadt | 188/269 |
| 2,240,644 | 5/1941 | Focht | 188/315 |
| 2,283,423 | 5/1942 | Clarke | 188/315 X |
| 2,324,058 | 7/1943 | Boor et al. | 188/269 |
| 2,352,401 | 6/1944 | O'Connor | 188/269 X |
| 2,507,266 | 5/1950 | Patriquin | 188/315 |
| 2,576,658 | 11/1951 | Werner | 188/315 X |
| 2,670,814 | 3/1954 | Ball | 188/315 |
| 2,714,942 | 9/1955 | Funkhouser | 188/315 |
| 2,849,090 | 8/1958 | DeKoning et al. | 188/315 |
| 4,015,835 | 4/1977 | Schumacher et al. | 187/67 X |
| 4,428,566 | 1/1984 | de Baan et al. | 188/269 X |

FOREIGN PATENT DOCUMENTS

| 1198818 | 6/1959 | France | 308/3.5 |
|---|---|---|---|
| 790139 | 2/1958 | United Kingdom | 188/322.17 |

*Primary Examiner*—George E. A. Halvosa

[57] ABSTRACT

A hydraulic elevator buffer contains a piston (plunger) which is pushed down into a volume of hydraulic fluid. The buffer has no seals separating its interior from the atmosphere. As the piston is pushed down, the displaced fluid is forced through ports in the cylinder which gives rise to a restricting force. The displaced fluid escapes into a volume in which an air/fluid mixture is produced. A nozzle area surrounds the piston at the top of the container, and the mixture is forced through the nozzle, separating the fluid and air. The fluid condenses down, lubricating the piston. The air is forced out through the space between the fluid container and the piston, removing any contaminants around the piston. The buffer contains a fluid-fill port which is at a horizontal angle at which a minimum and maximum fluid level in the buffer can be determined by looking in the port. The maximum is the level at which the fluid flows out of the port, and the minimum is the lowest level at which the fluid can be seen through the port.

3 Claims, 3 Drawing Figures

HYDRAULIC BUFFER FOR ELEVATORS

This is a continuation application under 37CFR 1.62 of prior pending application Ser. No. 512,520 filed on July 11, 1983, now abandoned.

DESCRIPTION

1. Technical Field

This invention concerns elevators, specifically, elevator buffers.

2. Background Art

Hydraulic buffers are used in elevators to decelerate the elevator car or the counterweight under certain conditions. The typical hydraulic buffer has a heavy fluid container and a piston that extends into this container to force fluid through the ports. This flow produces progressive deceleration, and the deceleration pattern is determined by the location of the ports along the direction in which the piston moves.

All current hydraulic elevator buffers of this type use piston seals to close off the space around the piston rod and the container to prevent entry of contaminating material, such as dust (which can abrade the piston and seal surfaces during buffer operations, e.g., during performance service checks) and to prevent the air/fluid mixture that results from a buffer operation from escaping. Moreover, the external seals deteriorate over time; sometimes becoming brittle. Buffer service life is highly dependent on the effectiveness of those piston seals in blocking contaminants and preventing fluid from escaping.

Mainly because of the seals, currently available buffers are comparatively expensive to construct and expensive and difficult to maintain, and require routine maintenance to check the seals.

DISCLOSURE OF INVENTION

A principal object of the invention is to provide a very inexpensive buffer that requires no seal inspection or service.

According to the present invention, a hydraulic fluid buffer has a piston (plunger) which extends through a sleeve in the top of a partially filled fluid (oil) container into an internal cylinder, also partially filled. When the piston is thrust down, hydraulic fluid is forced from the cylinder, which produces a fluid/air mixture within the container as the fluid level rises. This mixture is forced (by the action of the piston) through a fluid separator (e.g., a small passage) that surrounds the piston at the upper portion of the container, and the fluid and air in the mixture separate. The fluid drops out and is directed (e.g., funneled) to the piston, lubricating the piston as it travels down. The air is forced out of the container through the sleeve, removing contaminants, such as dust, from the space between the piston and the sleeve. As a result of this configuration, no seals are needed for the purpose of cleaning the piston or preventing fluid escaping from the container.

The present invention thus provides a buffer with a number of features. The buffer has no seals of any kind; all parts can be metallic. It requires no maintenance. Buffer test operation removes contaminants from the space around the piston.

A feature of the invention is the buffer may be easily and economically constructed as a single assembly, with all parts permanently attached (i.e., welded together) because no fasteners of any kind need to be used.

The invention thus offers an exceptionally simple, inexpensive and virtually maintenance-free buffer.

BEST MODE FOR CARRYING OUT THE INVENTION

Figure 1:
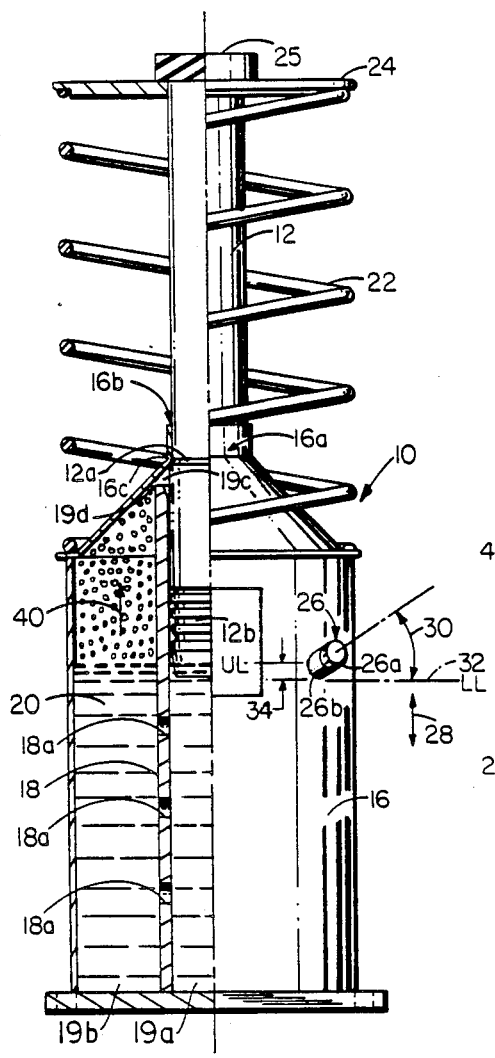
FIG. 1, an elevational view of an hydraulic buffer according to the present invention, shows the buffer partially cut away along section line 1—1 in FIG. 2, exposing its internal components and the fluid.
Figure 3:
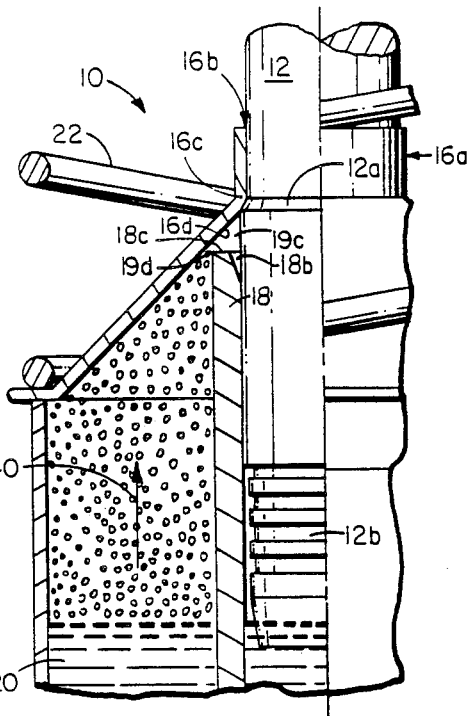
FIG. 3 is a magnified view of a portion of FIG. 1.
Figure 2:
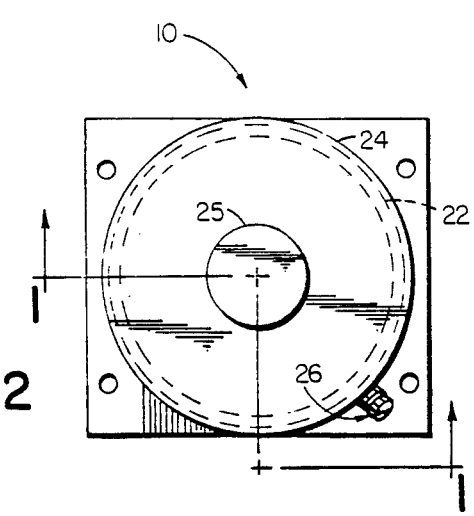
FIG. 2 is a plan view in the direction 2—2 in FIG. 1.

Referring to FIG. 1, a buffer 10 according to the present invention includes a piston 12 (i.e., a rod) which extends through a sleeve 16a into a container 16. Within this container 16 is an internal cylinder 18 (piston cylinder), so to speak, which receives the piston and guides it as it moves in and out of the buffer 10. The piston has a slightly elevated chamfered portion 12a which acts as a stop when it engages the portion 16c on the sleeve. The piston 12 also slides tightly within the internal cylinder 18. The piston cylinder 18 defines a first chamber 19a, a second chamber 19b outside it, and at the top a collection area 19c. Both chambers are partially filled with fluid (oil). There is a small annular passage 19d around the piston, formed by the top 18c of the piston cylinder and top inside surface 16d of the container 16, at the piston cylinder 18 which separates chambers 19b and 19c, and it acts as a nozzle to separate oil and air (this is explained below). The ratio between the height of the passage and its width (along the circumference of the cylinder 18) is 0.013. The ratio of the flow area upstream (below) the passage to the area at the passage is 120, and the ratio at the passage to the area downstream (near the piston) is 13. In addition, air may escape from the container under pressure thereon through the space 16b when the piston is rapidly pushed down; that air comes from the space 19d (nozzle) and, as explained below, cleans the space 16b around the piston.

The piston 12 contains ring-like cuts 12b along its lower end, and they provide an hydraulic dynamic seal without the use of rings, because hydraulic fluid in these seals is evenly distributed, under even pressure, around the piston, which helps align the piston and lubricate it as it moves in the internal cylinder 18. (As an alternative, a single metallic piston ring may be used in the groove furthest from the piston face to limit the flow past the piston.) Following conventional technology, the cylinder contains ports 18a along that part of its vertical length that is within the area immersed in fluid 20. As the piston strokes down, fluid is displaced through these ports from chamber 19a to chamber 19b. The number of remaining ports decreases (this is not shown) during the downstroke, and thus the flow area decreases, which increases the resistance to fluid flow as the piston moves down the cylinder. At the same time, the piston speed decreases as the elevator is decelerated and the rate of flow of fluid through the port area is correspondingly reduced. Thus, the buffer stopping force remains substantially constant with piston displacement, thus imparting a substantially uniform deceleration to the elevator. A spring 22 surrounds the piston 12 and is located at the uppermost portion of the piston between the cylinder 16 and the striker plate 24. The spring biases the piston up, holding it in a position at which the chamfer portion 12a rests against the lowestmost portion 16c bore 16b. On top of the plate is a hard rubber block (resembling a hockey puck) 25, which is contacted by the object, i.e., the elevator cap or counterweight, to force the piston down into the cylinder (into the fluid).

A filler hole 26 is located at a special vertical height 28 on the cylinder. It may have a screw-in cap and is oriented at a special angle 30 to the horizontal 32. The angle 30, which in the preferred embodiment is about 20°, is such that fluid can be poured into the cylinder until it reaches a level which corresponds to the level of the lowest surface 26a on the outermost portion of the filler hole 26. (If the angle is too high, air will be trapped inside the cylinder, preventing more fluid from entering.) The distance 34 between the upper level UL and the lower level LL, defined by the lower surface 26b of the innermost portion of the filler hole, is the minimum and maximum fluid levels; simply by looking in the filler hole that can be checked.

During operation of the buffer (as it is pushed down under load) fluid is pushed up in chamber 19b, and this occurs, as mentioned, through the ports 18a in the internal cylinder 18. It should not go unnoticed that this internal cylinder does not extend all the way up to the cap; there is that small space 19d between the lid 16a and the upper portion of the cylinder 18. This configuration creates a a circular nozzle around the top of the cylinder 18. As the fluid is pushed up (see arrow 40), a mixture of fluid and air (the bubbles that are shown) is produced, in the upper area by the fluid agitation as the fluid rises. This mixture is forced through the space 19d, and it acts as a nozzle; that is, agitation and pressure change across the space cause the air and fluid (oil) to separate, and the fluid drops down (condenses) in chamber 19c (it acts as a funnel) around the piston, lubricating the piston as it moves down. The inner cylinder 18 is chamfered around the piston to provide a small fluid collection reservoir 18b for the condensed liquid. The air is forced up under the pressure in the cylinder and out through the space between the piston and the sleeve, removing dirt and dust from that space (it should be as clean as possible). In contrast, other buffers have seals that are located in the space around the piston for these cleaning and sealing purposes. But, the seals deteriorate (as a result of the dirt and dust which they wipe off and age), and, as a result, normally have to be replaced from time-to-time. But, in this buffer such seals are not present, and hence, such routine maintenance is unnecessary.

The foregoing demonstrates that by comparison to current buffers, a buffer embodying the present invention is very simple and reliable, inexpensive and easy to maintain.

The foregoing description of a buffer embodying the present invention will suggest, to one skilled in the art, various modifications and alterations, without departing from the true scope and spirit of the invention.

We claim:

1. A hydraulic buffer, for location at the bottom of an elevator shaft to decelerate an elevator car, characterized by:
   a container for buffer oil (16);
   a piston cylinder (18) within said container (16), said piston cylinder (18) defining two fluid chambers (19a, 19b) within the container (16), one (19a) within the piston cylinder, the second (19b) around the piston cylinder, said piston cylinder (18) containing ports (18a) connecting the two chambers (19a, 19b);
   a piston (12) extending through a congruent sleeve (16c) in the top of the container (16) into said piston cylinder (18), said sleeve (16c) being about the top (18c) of said piston cylinder (18), there being a space between the piston and the sleeve allowing air to escape from the interior of the container to the surrounding environment outside said container, said space extending around the piston for the entire length of the sleeve;
   the top of the piston cylinder (18c) and the top (16d) of the container defining a nozzle (19d) between the uppermost portion of the second chamber (19b) to an area (19c) on top of said piston cylinder (18), that is within the container and directly exposed to the piston (12) and the sleeve (16c), said nozzle providing a volumetric expansion to an oil/air mixture forced therethrough to said area (19c) from the second chamber (19b) whereby the oil condenses from said mixture as it passes through the nozzle (19d) and air in the mixture escapes through the space (16b) between the sleeve (16c) and the piston (12) to aid in maintaining said space free from blockage; and
   a spring (22) that extends the piston (12) out of the container (16).

2. A hydraulic buffer, for location at the bottom of an elevator shaft to decelerate an elevator car, characterized by:
   a container for buffer oil (16);
   a piston (12) which extends through the top of the container, there being an air-flow space (16b) completely around the piston between the piston (12) and the container where the piston (12) extends therefrom allowing air to escape from the interior of the container to the surrounding environment outside said container such that said space is maintained free from blockage;
   a piston cylinder (18) within the container (16) to create a first chamber (19a) within the cylinder and a second chamber (19b) around the cylinder (18) and containing ports (18a) connecting the two chambers (19a, 19b), said piston (12) extending into said cylinder (18), the top of said piston cylinder (18) being in close proximity to, but spaced from the top (16d) of the container (16) creating a narrow annular passage (19d) between the second chamber (19b) and an annular space (19c) on top of the piston cylinder (18) around the piston (12) at the point at which the piston passes through the container (16) and within the container; and
   a spring (22) that extends the piston (12) out of the container (16).

3. A hydraulic buffer according to claim 1 or 2 further characterized in that:
   the top (18c) of the piston cylinder (18) is chamfered to create a small annular oil collection reservoir (18b) around the piston (12).

* * * * *